(12) United States Patent
Grab et al.

(10) Patent No.: US 7,295,673 B2
(45) Date of Patent: Nov. 13, 2007

(54) METHOD AND SYSTEM FOR SECURING COMPRESSED DIGITAL VIDEO

(75) Inventors: Eric W. Grab, San Diego, CA (US); Adam H. Li, San Diego, CA (US)

(73) Assignee: DivX, Inc., San Diego, CA (US)

( * ) Notice: Subject to any disclaimer, the term of this patent is extended or adjusted under 35 U.S.C. 154(b) by 847 days.

(21) Appl. No.: 10/615,898

(22) Filed: Jul. 8, 2003

(65) Prior Publication Data
US 2004/0081333 A1    Apr. 29, 2004

Related U.S. Application Data

(60) Provisional application No. 60/420,500, filed on Oct. 23, 2002.

(51) Int. Cl.
*H04N 7/167*   (2006.01)
(52) U.S. Cl. .................... 380/239; 380/217
(58) Field of Classification Search .............. None
See application file for complete search history.

(56) References Cited

U.S. PATENT DOCUMENTS 5,805,700 A * 9/1998 Nardone et al. ............ 380/217
7,151,832 B1 * 12/2006 Fetkovich et al. .......... 380/210
7,151,833 B2 * 12/2006 Candelore et al. .......... 380/217

OTHER PUBLICATIONS

Author unknown, "Information Technology—Coding of Audio-Visual Objects—Part 2: Visual", International Standard, ISO/IEC 14496-2, Third edition, Jun. 1, 2004, pp. 1-706.

* cited by examiner

*Primary Examiner*—Nasser Moazzami
*Assistant Examiner*—Pramla Parthasarathy
(74) *Attorney, Agent, or Firm*—Kauth, Pomeroy, Peck & Bailey LLP

(57) ABSTRACT

A method for producing and for subsequently decrypting a protected stream of compressed video content is described herein. The method includes receiving an input stream of compressed video content containing a sequence of frames. A set of encrypted frames are created by encrypting selected frames of the sequence of frames in accordance with a frame encryption function. The method further includes generating frame decryption information necessary to decrypt the set of encrypted frames. In a particular implementation the protected stream is assembled using the set of encrypted frames, unencrypted frames from the input stream, and the frame decryption information. The decryption process is initiated by receiving the protected stream of compressed video content and the corresponding frame decryption information. In this regard the frame decryption information includes data distinguishing the encrypted frames from the unencrypted frames of the compressed video content within the protected stream. The encrypted frames are then decrypted in accordance with the frame decryption information.

32 Claims, 12 Drawing Sheets

METHOD AND SYSTEM FOR SECURING COMPRESSED DIGITAL VIDEO

CROSS-REFERENCE TO RELATED APPLICATIONS

This application claims priority under 35 U.S.C. §119(e) to U.S. Provisional Application No. 60/420,500, filed Oct. 23, 2002 entitled METHOD AND SYSTEM FOR SECURING COMPRESSED DIGITAL VIDEO, which is incorporated by reference herein in its entirety.

FIELD OF THE INVENTION

The present invention relates to the field of the encryption and efficient decryption of video information. More specifically, the present invention is directed to a method and system for generating a protected stream of compressed digital video and for decrypting the protected stream in a bounded-bandwidth fashion.

BACKGROUND OF THE INVENTION

As is known, modern video display devices are capable of displaying individual of dots of light, or "pixels", of various colors. The term "frame" has been employed to refer to a matrix of pixels at a given resolution. For example, a frame may comprise a 640 by 480 rectangle of pixels containing 480 rows having 640 pixels each. In an uncompressed state, the amount of data required to represent a frame is equal to the product of the number of pixels together with the number of bits associated with each pixel used in color representation. Thus, in a pure black and white image lacking any grayscale shades, a pixel could be represented by one bit where "1" represents white and "0" represents black. More typically, in modern full-color displays a single pixel is represented by 8-bits, 16-bits or 32-bits. Thus, a single uncompressed 32-bit frame at a resolution of 640 by 480 would require (32*640*480) 9.8 million bits, or 1.2 Megabytes of data.

The representation of digital video involves the display of a series of frames in sequence (e.g., a motion picture is composed of 24 frames displayed every second). Thus, one second of uncompressed 32 bit frames at a pixel resolution of 640 by 480 requires 29.5 Megabytes of data (i.e., 1.2*24). As a consequence of the large amount of data associated with uncompressed digital video, various compression techniques have been employed in an effort to reduce the bandwidth required to transmit digital video.

Existing digital video compression techniques are complex processes which rely upon a variety of techniques in transforming (i.e., "encoding") a unit of uncompressed video data into an encoded form. Such encoding permits fewer bits to be used in representing the content of the original uncompressed video data. The resultant encoded data is capable of being transformed using a reverse process (i.e., "decoding") yielding a digital video unit of data that is either visually similar or identical to the original data. Encoding techniques which enable recovery of an identical version of the original data are characterized as "lossless", while those that yield only visually similar versions are categorized as "lossy".

Modern techniques of digital video compression can achieve very high levels of compression with relatively low loss of visual quality. As a general rule, modern techniques of digital video compression are very computationally intensive, with the degree of computational intensity varying directly with the extent of compression. Anything that adds to computational intensity over and above the processing overhead associated with the applicable decoding process is undesirable, since this leads to increased system complexity and expense. In particular, in most efficient forms of modern compression the amount of data in each compressed video frame will vary, sometimes to a great extent. This maximizes compression, but at the cost of making the processing power needed to decode the frames inconsistent.

Turning now to FIG. 1, a block diagram is provided of a conventional digital video encoder 125. As mentioned above, digital video encoders have been used to reduce the size of a stream of uncompressed digital video data. The digital video encoder 125 is comprised of a video processing unit 110 and an entropy compression unit 115. Digital video encoder 125 is configured to generate compressed video output by using motion estimation and motion compensation to exploit temporal redundancy in certain of the uncompressed video frames 120.

During operation of video encoder 125, video processing unit 110 accepts uncompressed video frames 120 and applies one or more video and signal processing techniques to such frames. These techniques may include, for example, motion compensation, filtering, two-dimensional ("2D") transformation, block mode decisions, motion estimation, and quantization. The associated 2D event matrices include some or all of a skipped blocks binary matrix, a motion compensation mode (e.g. intra/forward/bi-directional) matrix, a motion compensation block size and mode matrix (e.g. 16×16 or 8×8 or interlaced), a motion vectors matrix, and a matrix of transformed and quantized block coefficients. Practical implementations of the video processing unit 110 and entropy compression unit 115 generally operate in accordance with one of the accepted video compression standards of the type discussed below.

In the special case of a video encoder employing lossy compression, these video and signal processing techniques aim to retain image information that is important to the human eye. The video processing unit 110 produces intermediate data streams 124 that are more suitable for use by the entropy encoding algorithms executed by the entropy compression unit 115 than are the uncompressed video frames 120. Conventionally, these intermediate data streams 124 would comprise transform coefficients with clear statistical redundancies and motion vectors. As an example, video processing unit 110 may apply a block discrete cosine transform (DCT) or other transform function to the output of motion compensation and quantize the resulting coefficients.

An entropy coding technique such as Huffman Coding may then be applied by entropy compression unit 115 to the data streams 124 in order to produce a compressed stream 130. Entropy compression unit 115 may compress the data streams 124 with no loss of information by exploiting the statistical redundancies therein. The compressed stream 130 output by entropy compression unit 115 is of significantly smaller size than both the uncompressed video frames 120 and the intermediate data streams 124.

As shown in FIG. 2, a conventional digital video decoder 230 may be bifurcated into two logical components: entropy decompression unit 235 and video processing unit 240. Entropy decompression unit 235 receives the compressed data stream and outputs data streams 250, which typically comprise motion vectors and transform (or quantized) coefficients. Video processing unit 240 receives the data stream output 250 from decompression unit 235 and performs operations such as motion compensation, inverse quantization, and inverse 2-D transformation in order to reconstruct the uncompressed video frames.

The Motion Pictures Experts Group (MPEG) and the International Standards Organization (ISO) have produced international standards specifying the video compression and decompression algorithms of the type implemented by the encoder 125 and decoder 230, respectively. These standards include MPEG-1, MPEG-2, MPEG-4, H.261, H.263, and permit equipment and software from different manufacturers to exchange compressed video formatted in accordance with such standards.

FIG. 3 shows a graph 300 displaying an approximate representation of the relative processing power expected to be required in connection with decoding of frames of different sizes. For example, FIG. 3 shows that certain frame (see, e.g., frame 304) require much more processing power than other frames (see, e.g., frame 302). Any processing of frames required in addition to decoding (e.g., decryption) consumes yet further processing resources.

As is known, various types of encryption schemes may be used to protect data. In the digital realm, encryption is often implemented by using a collection of bits of some length known as a "key" to execute a predictable transform on a unit of data. This yields another unit of data that cannot be "read" without knowledge of the key used to execute the transform. The process of encryption is only easily reversible to the extent the encrypting key or its counterpart (e.g., a "public" key) is available for use in transforming or "decrypting" the encrypted data back into the original form. Video data is often encrypted using a symmetric block cipher conforming to, for example, the Data Encryption Standard (DES) or Advanced Encryption Standard (AES).

Turning now to FIG. 4, a graphical representation 400 is provided of the processing power necessary required to both decrypt and decode a sequence of frames. FIG. 4 also depicts graph 300, which illustratively represents the relatively smaller amount of processing power required to decode unprotected (i.e., unencrypted) frames. As may be appreciated by reference to FIG. 4, the maximum processing power required to both decrypt and decode a frame increases proportionally to its size. As a consequence, adequate processing power needs to be provided to ensure that even the largest frames expected to be received may be successfully decrypted and decoded. This requirement may significantly increase system cost and complexity, even though only a relatively small percentage of received frames may necessitate use of the full extent of available peak processing power. Accordingly, a need exists for an adequately secure technique for bounding the resources consumed during decryption, thereby reducing peak processing requirements.

SUMMARY OF THE INVENTION

In summary, the present invention relates to a method for producing a protected stream of compressed video content. The inventive method includes receiving an input stream of compressed video content containing a sequence of frames. A set of encrypted frames are created by encrypting selected parts of selected frames of the sequence of frames in accordance with a frame encryption function. The method further includes generating frame decryption information necessary to decrypt the set of encrypted frames. In a particular implementation the protected stream is assembled using at least the set of encrypted frames and the frame decryption information. In certain embodiments the present invention may be implemented such that only approximately 3% or less of the compressed video data need be encrypted in order to introduce adequate protection.

The present invention also pertains to a method for decrypting compressed video content. Pursuant to this method an input stream of compressed video content containing encrypted frames and unencrypted frames is received. The method also involves receiving frame decryption information necessary to decrypt the encrypted frames. In this regard the frame decryption information includes data distinguishing the encrypted frames from the unencrypted frames of the compressed video content. Finally, the encrypted frames are decrypted in accordance with the frame decryption information.

In another aspect the invention relates to an encrypting digital video encoder which includes a video processing unit configured to generate a plurality of input data streams in response to a sequence of uncompressed video frames. An entropy compression unit creates, based upon the plurality of input data streams, compressed video content containing a sequence of compressed frames. The encrypting digital video encoder further includes a video encryption module operative to transform the sequence of compressed frames into a protected video stream containing a set of encrypted frames. In a particular implementation the protected video stream may comprise an encrypted video stream containing the set of encrypted frames and the unencrypted frames within the compressed frame sequence. The encrypted video stream may be synchronized with frame decryption information necessary to decrypt the set of encrypted frames.

The invention also pertains to an decrypting digital video decoder including a video decryption module configured to receive a protected input stream of compressed video content. The protected input stream contains at least a set of encrypted frames and frame decryption information necessary to create a set of decrypted frames through decryption of the set of encrypted frames. An entropy decompression unit creates, based at least in part upon the set of decrypted frames, a plurality of video data streams. The inventive video decoder further includes a video processing unit for generating an output stream of uncompressed video content in response to the plurality of video data streams.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE EXEMPLARY EMBODIMENTS

The present invention provides a unique approach for protecting compressed digital video using various encryption techniques. In particular, an "encryption layout" approach is employed to encrypt a stream of compressed digital video. In accordance with this approach, selected portions of a stream of compressed digital video are encrypted and replaced with the results of the encryption process. Such selective placement of encrypted material consistent with an encryption layout function permits, for example, the recovered video stream to reflect a desired degree of perceived degradation or "scrambling". For example, when the applicable encryption layout or frame encryption function prescribes that the header data of a given frame is encrypted, a sufficiently large amount of video information may become unusable such that the frame is effectively "blacked out" (i.e., is skipped during playback). Frames may support numerous encryption layout approaches consistent with the invention, two of which are termed "header layout" and "middle layout".

As is described below, use of header layout encryption can result in a visual blackout of the associated video through placement of encrypted material within critical areas of the header portion of a given frame. In contrast, "middle layout" encryption yields a visually scrambled or "white noise" type of video effect. The "middle layout" approach contemplates the placement of encrypted material at a location corresponding to a specified offset into the frame, which has the effect of locating the scrambled effect within a desired area upon playback of the video containing the frame.

Figure 5:
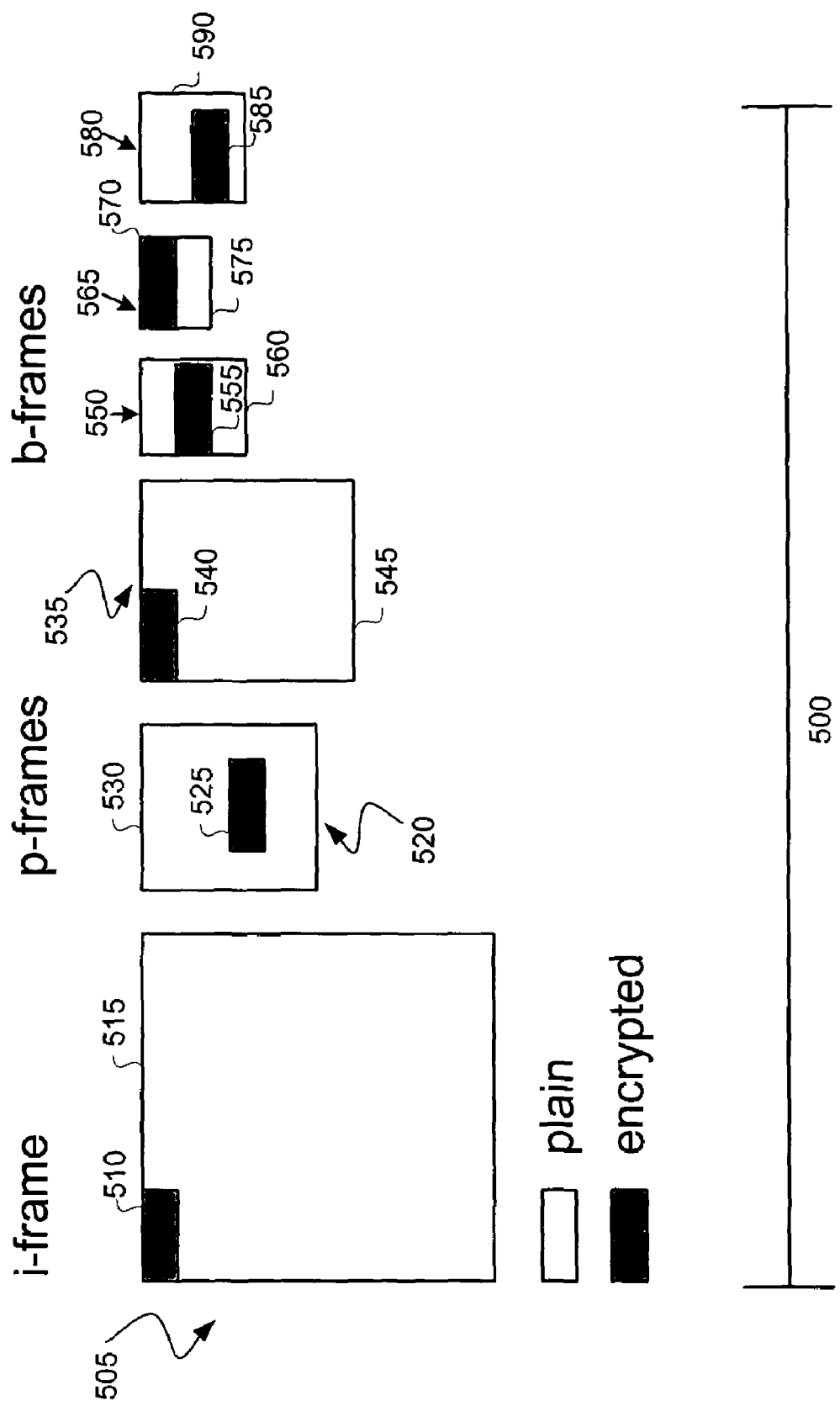

FIG. 5 provides an overview of header layout and middle layout encryption as applied to three different types of frames within a video stream 500 formatted consistently with the MPEG-4 standard. Specifically, the video stream 500 includes intra frames (i-frames), predictive frames (p-frames), and bi-direction predictive frames (b-frames). As shown, a particular i-frame 505 contains an encrypted portion 510 and an unencrypted portion 515. Encrypted portion 510 of i-frame 505 is located at the beginning of the frame, thus indicating that header layout encryption has been applied. If video stream 500 were used to generate a visual display without being decrypted, the encrypted portion 510 within the header of i-frame 505 would cause a blacked-out portion to appear in such visual display during the interval corresponding to i-frame 505.

Again referring to FIG. 5, a p-frame 520 and a p-frame 535 are shown to contain encrypted portions 525 and 540, respectively. The encrypted portion 525 of p-frame 520 has been applied with an offset, thus indicating that middle layout encryption has been applied. This will cause p-frame 530 to be displayed (without decryption) as a random static-like pattern. As is similarly indicated by FIG. 5, header layout encryption has been applied to p-frame 535. That is, encrypted portion 540 within appears within the header of p-frame 535, which will cause p-frame 535 to appear as a blacked out frame if it is attempted to be displayed without decryption.

FIG. 5 also depicts b-frames 550, 565, and 580. As above, the encrypted portion 555 within b-frame 550 and the encrypted portion 585 within b-frame 580 evidences the application of middle layout encryption to b-frame 550 and b-frame 580, which will result in the occurrence of a scrambling effect is such frames are displayed without decryption. As is indicated by FIG. 5, header layout encryption has been applied to b-frame 565 (i.e., see encrypted portion 570), which will result in this frame being blacked-out if displayed without being decrypted.

In an exemplary embodiment, the digital video encryption process of the present invention may be controlled through appropriate specification of a frame encryption frequency ($1/f$) and an encryption quantity (n). For example, specification of a frame encryption frequency of 1/100 (i.e., $1/f=1/100$) results in one of every 100 frames of an input video stream being processed. In like manner specification of an encryption quantity of 12 (i.e., n=12) means that in every frame subject to encryption, twelve data units (e.g., bytes) would be encrypted at the location consistent with the applicable encryption layout format. Finally, each frame so encrypted is marked as "encrypted", while all other frames within the input video stream are marked as "plain" or the like, or remain unmarked.

Figure 6:
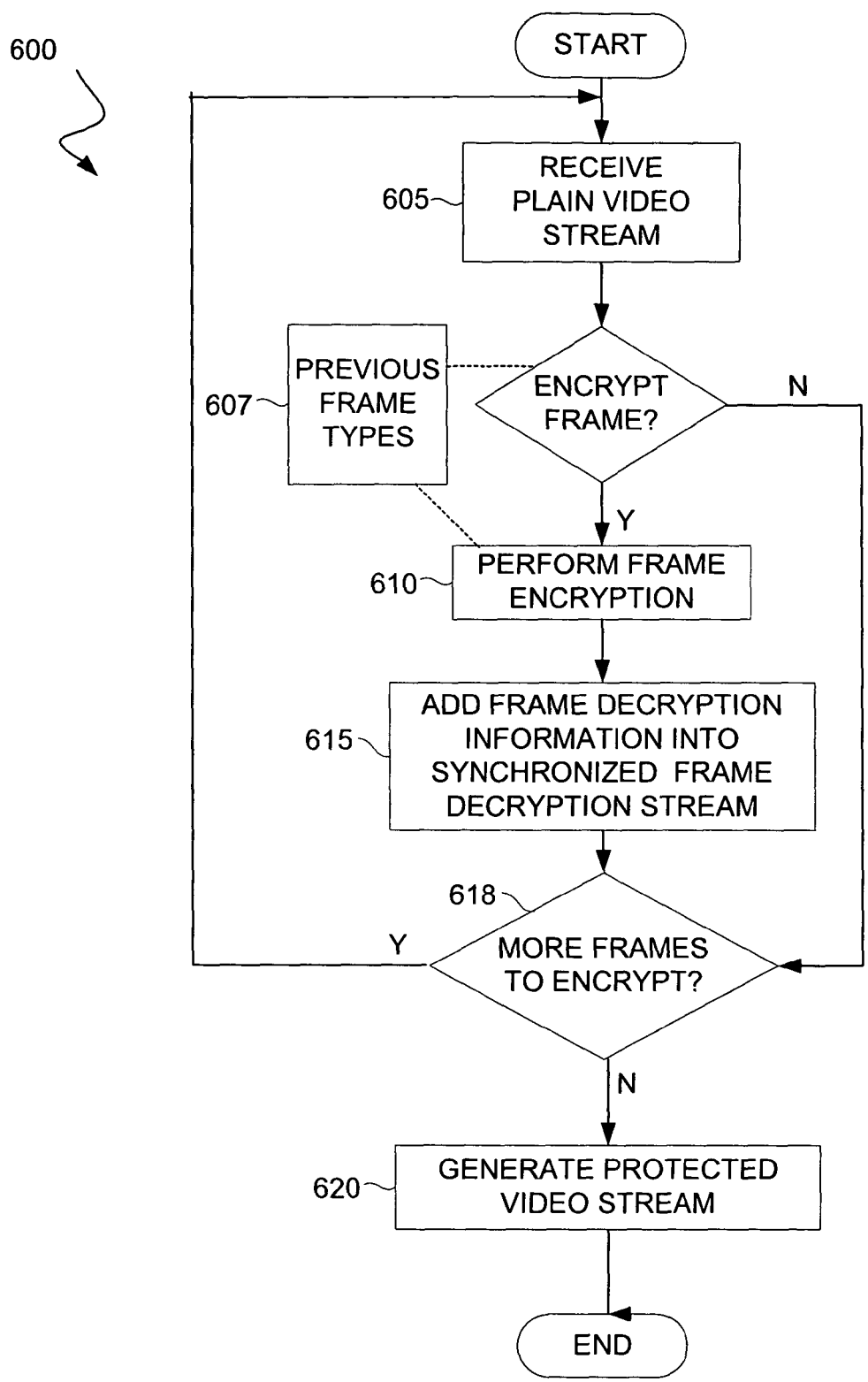
FIG. 6 is a flow chart providing a more detailed overview of a frame encryption process according to the present invention

Turning now to FIG. 6, a flow chart 600 is provided which shows a more detailed overview of a frame encryption process according to the present invention. At a step 605, an unencrypted input video stream is received. This input video stream could be in the form of, for example, an MPEG-4 encoded video stream. Until it is encrypted in the manner described below, the input video stream is capable of being conventionally displayed and rendered without degraded visual quality. In a step 607, a record is maintained of previous frame types and data that have been processed. The previous frame data tracked in this manner enables selection of values enabling efficient encryption operations to be subsequently performed. At a step 610, frame encryption is applied to selected frames of the input video stream received in step 605 in accordance with the applicable encryption layout format (e.g., header or middle layout encryption) dictated by the previous frame data recorded pursuant to step 607.

In the embodiment of FIG. 6, all encrypted frames are tagged with the necessary information to be decrypted. Thus, once a frame has been encrypted per step 610, the information needed to decrypt the encrypted be can be added into a synchronized frame decryption stream (step 615). This synchronized frame decryption stream contains the information necessary decrypt all of the encrypted frames, and may include, for example, encryption on/off status, encryption key or key pointer, offset value into the frame (i.e., the beginning of the encrypted portion of the frame), and size of the data field to be decrypted.

In the exemplary embodiment each frame encryption key is used to encrypt a predefined number of frames. That is, after a given encryption key has been used to encrypt the a number of frames, a new key is utilized to encrypt a possibly different number of subsequent frames. As indicated above, the frame decryption stream includes a key or key pointer identifying the decryption key to be used in connection with decryption of each encrypted frame.

Once frame encryption has been applied to all frames (step 618) and the synchronized frame decryption stream has been assembled, the overall protected video stream may be generated (step 620). This may include, for example, combining the encrypted frames and the synchronized frame decryption information.

Figure 7:
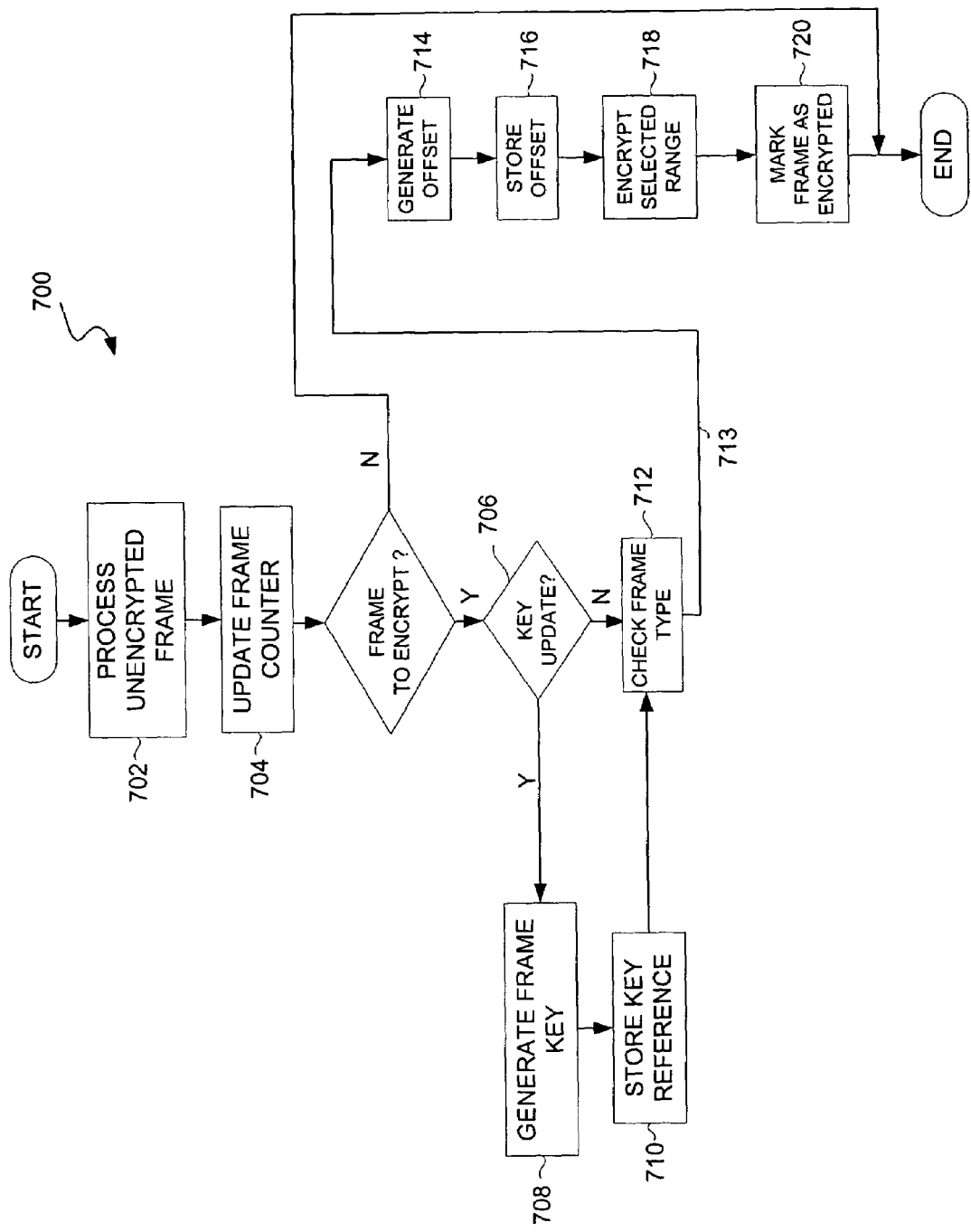
FIG. 7 is a flow chart detailing one implementation of a frame encryption process consistent with the present invention.

FIG. 7 is a flow chart 700 detailing one implementation of the frame encryption process generally identified above (step 610). At a step 702, an unencrypted frame from the original input video stream is parsed so as to determine its boundaries, size and type. In the event the input stream is formatted consistently with the MPEG-4 standard, this parsing ensures that the subsequent encryption process will not write over the video object plane (VOP) start code of the next frame. As part of this parsing process, a count may also be kept of the number of frames of each type which have been parsed. The frame type and count information obtained during the parsing process may be used in determining the intra-frame offsets to be employed during the ensuing encryption process.

Once an unencrypted frame has parsed (step 702), a frame counter is incremented (step 704). In general, the frame counter may be used as part of the selection criteria for the type of encryption to be applied, as well as in determining whether the encryption key employed during previous encryption operations is to be changed. Specifically, a decision may be made of whether or not to perform a key update at least in part based upon the value of the updated frame counter (step 706). If a key update is required, a new frame key is spontaneously generated or selected from an existing list of keys (step 708). In the exemplary embodiment, generation of the frame key can include a selection of a random or pseudorandom key. Once the new frame key has been generated, it is stored in a key table for later use during the encryption process (step 710). If a key update is not necessary in step 706, the type of frame to be encrypted is determined (712). In MPEG-4 environments, the frame to be encrypted will be determined to be either an i-frame, p-frame, or b-frame. Based upon the value of the frame counter, the frame size, and the frame type, an intra-frame offset, also referred to herein as simply "offset", is determined (714). Once the offset has been generated (step 714), it is then stored (step 716). In a particular implementation the size of each middle offset is generated randomly.

As mentioned above, both a header offset and a middle offset may be employed within the exemplary embodiment. A header offset effectively corresponds to an offset of zero, which means that encryption is started from the end of the VOP start code of the applicable frame. In contrast, a middle offset defines a positive offset into the frame beyond the end of the VOP start code. The offset may range from one up to a maximum value equivalent to the frame size less the number of bytes to encrypt. It is noted that if the offset were larger than this maximum value, essential information from the next frame within the input frame sequence could be inadvertently overwritten. Furthermore, the value of the offset used may be limited such that the amount of the frame to be encrypted is not reduced. Such a reduction could occur when the offset, in combination with the size of the data to be encrypted, extends beyond the end of the frame. For example, if five units of data are to be encrypted and the frame size is ten units, any resulting offset will be constrained to be between one and five units.

It may also be desired to apply header and offset encryption at a predetermined frequency with respect to each frame type. For example, the frequency of application of header encryption with respect to i-type frames could assume a value of "3", which would mean that header offset encryption would be applied to every third frame. In particular implementations the application frequency of each type of encryption offset (i.e., header and middle offset) with respect to the various frame types can be based upon a function or series. For example, a Fibonacci series could be used, resulting in a specified encryption offset being applied at frame numbers 1, 1, 2, 3, 5, 8, 13, 21 . . . Alternatively, a non-linear function could be used so that any pattern to the offsets would be difficult to detect.

Turning again to FIG. 7, once the encryption offset has been generated and stored (step 716), sufficient information exists for the frame to be encrypted (step 718). In this regard the encryption is effected using the key previously stored (step 710) and is conducted over a specified number of units of the frame. The number of bytes encrypted may be determined based upon the level of available processing power and desired degradation of visual quality. Any type of block or stream encryption, such as encryption consistent with the Digital Encryption Standard (DES) or Advanced Encryption Standard (AES), may be applied to the frame portion encrypted pursuant to step 718. In certain implementations more complex forms of encryption may be employed. For example, encryption may be performed in a Cipher Block Chaining (CBC) mode, in which the previously encrypted block is used to seed the next block encrypted. I-frame boundaries will restart the CBC, which will allow seeking to i-frames. Once encrypted, the frame will be marked as encrypted and the necessary frame decryption information identified in order to facilitate subsequent decryption. Such frame decryption information may identify the applicable particular encryption layout, intra-frame offset, encryption/decryption key, and the size of the encrypted frame portion.

Figure 8:
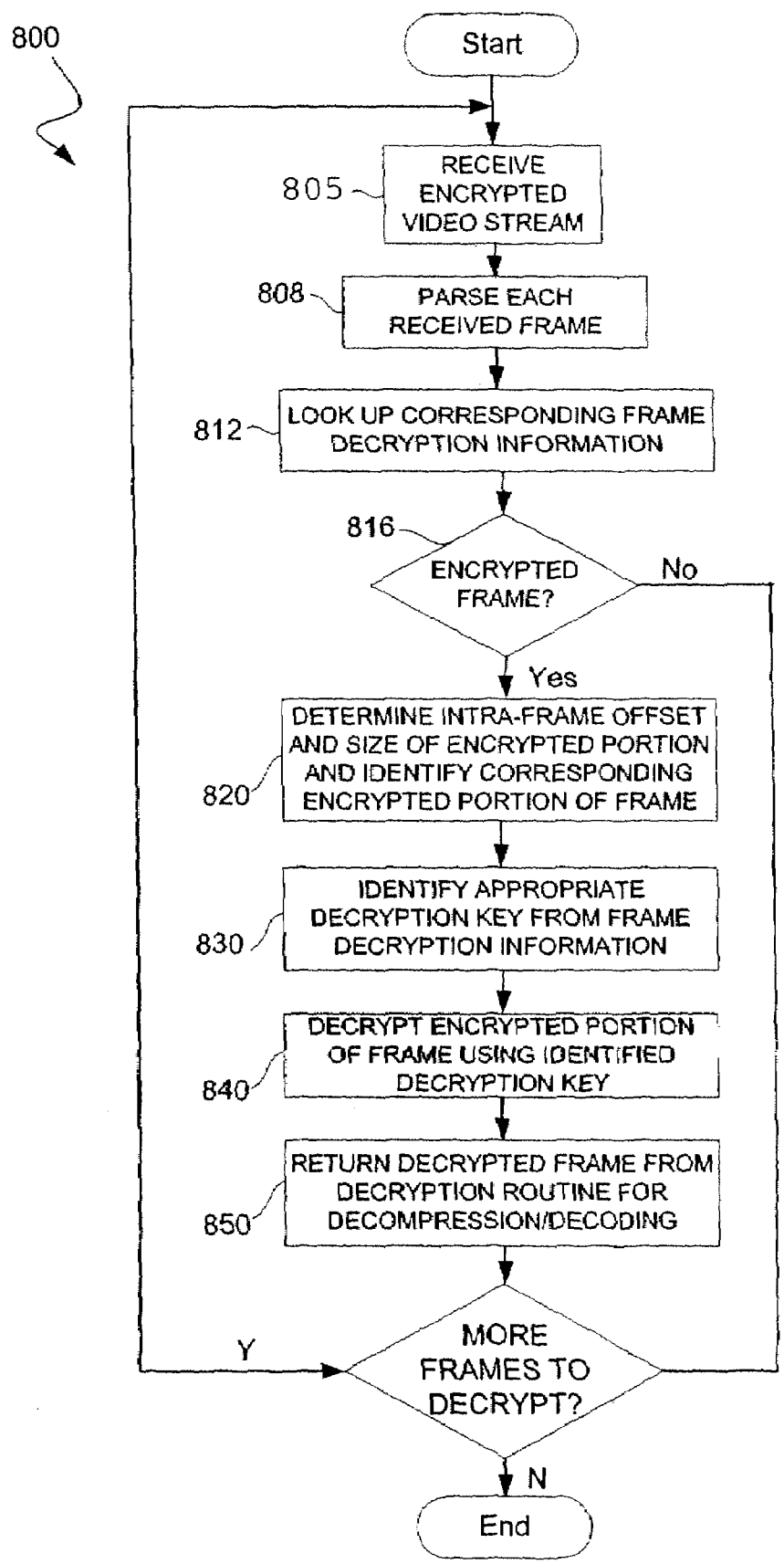
FIG. 8 is a flow chart detailing an exemplary implementation of a frame decryption process in accordance with the invention.

FIG. 8 is a flow chart 800 detailing an exemplary implementation of a frame decryption process in accordance with the invention. As shown, in a step 805 a protected video stream previously generated in accordance with the invention is received. In the embodiment of FIG. 8, the protected video stream is comprised of a sequence of selectively encrypted frames accompanied by corresponding frame decryption information and assembled in the manner described above. During the parsing (step 808) of each received frame within the protected video stream, decryption information corresponding to the frame being parsed is retrieved from the received decryption information (step 812). If the retrieved decryption information indicates that the frame has been identified as encrypted, the frame is dispatched to a frame decryption routine (step 816). This decryption routine first retrieves, from the frame decryption information corresponding to the frame being decrypted, the intra-frame offset information (i.e., the offset into the frame at which the encrypted portion is located) and the size of the encrypted portion of the frame (step 820). This information enables the decryption routine to determine the specific portion of the frame to be decrypted. Once this frame portion has been determined, the decryption routine obtains the applicable decryption key from the received frame decryption information (step 830). Next, the encrypted portion of the frame is decrypted using the appropriate decryption key (step 840). The resultant unencrypted frame is then returned from the decryption routine and decompressed/decoded in the manner described below with reference to FIG. 12 (step 850).

Figure 9:
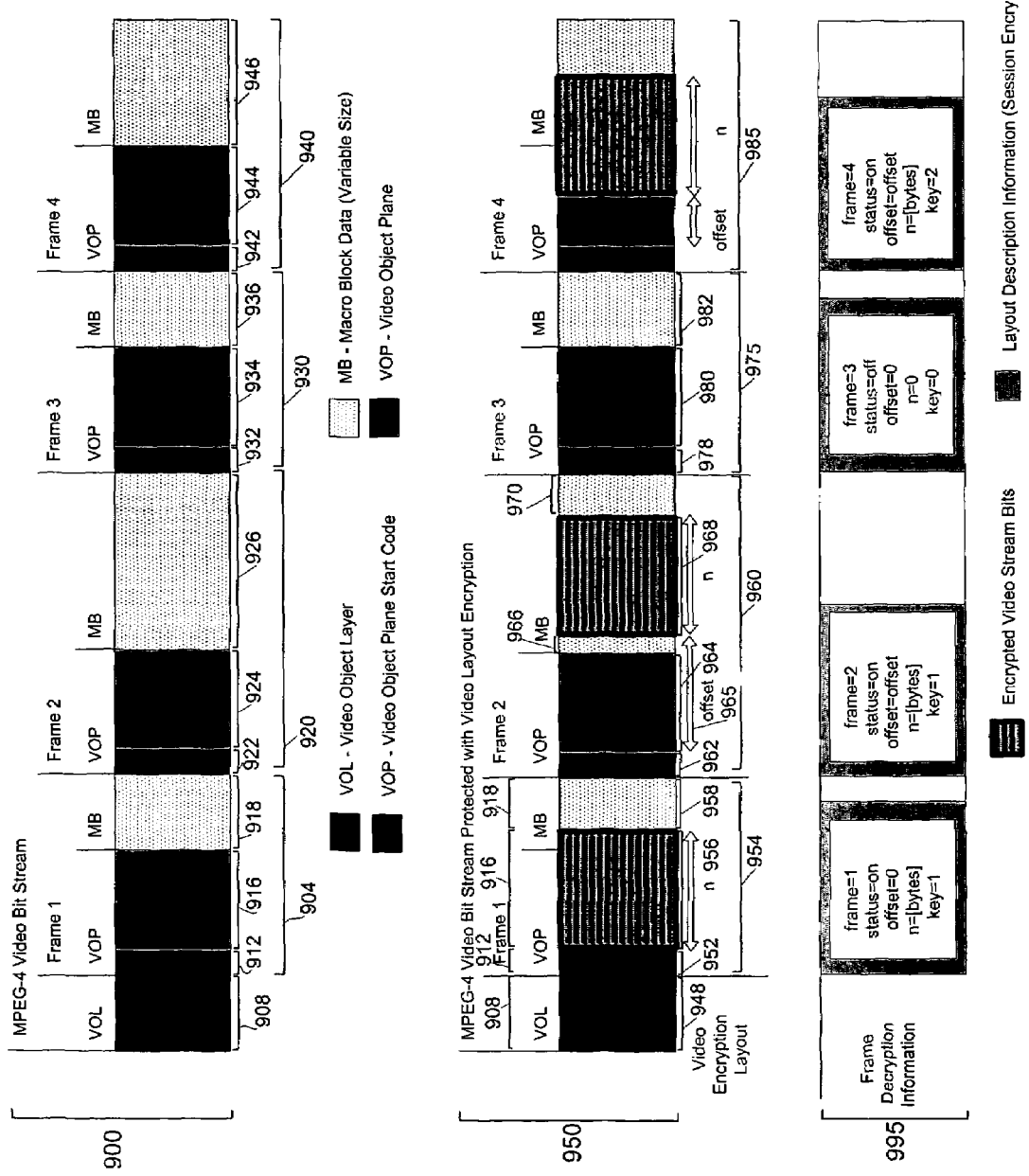
FIG. 9 depicts the structure of an unencrypted video stream and of a video stream encrypted in accordance with the present invention.

FIG. 9 depicts the structure of an unencrypted video stream and of a video stream encrypted in accordance with the present invention. As shown, a set of four frames included within an unencrypted video stream 900 are depicted; namely, a first frame 904 and remaining frames 920, 930, and 940. As is known in the art, video stream 900 begins with a video object layer 908, which is followed by the first frame 904. An initial portion of first frame 904 comprises video object plane start code 912, which can serve as a point of resynchronization for the video signal. The succeeding portions of first frame 904 consist of video object plane 916 and macroblock 918, the contents of which are familiar to those skilled in the art. The remaining frames 920, 930, and 940 in unencrypted video stream 900 follow the same general structure as first frame 904 (i.e., a video object plane start code, followed by a video object plane, and lastly a macroblock).

FIG. 9 also depicts an encrypted video stream 950, which represents an encrypted version of the unencrypted video stream 900. In addition, FIG. 9 illustratively represents the frame decryption information 995 needed to properly decrypt the encrypted video stream 950. In the exemplary embodiment the decryption information 995 may be incorporated within or otherwise transmitted in conjunction with the encrypted video stream 950. Upon receipt at the location of the video decoder (FIG. 12), the decryption information will be stored within a table in a format consistent with the applicable compression protocol (e.g., MPEG-4) and referenced during the decoding process described below. In the embodiment of FIG. 9, the frame decryption information 995 identifies, with respect to each frame of encrypted video stream 950, the frame number, the status of encryption (on or off), the offset length, the number of bytes encrypted, and a reference to the applicable encryption key.

As shown in FIG. 9, encrypted video stream 950 begins with a video object layer 948 identical to that within the original video stream 900. That is, in order to ensure that the encrypted video stream 950 may be properly decrypted, the video object layer 948 is not encrypted during the process of encrypting the original video stream 900. The first encrypted frame 954 in encrypted video stream 950 contains a video object plane 952 as its first element. As is shown, the frame decryption information 995 indicates that a header offset (i.e., offset of zero) follows video object plane 952 within first frame 954. With an offset of zero, encryption begins immediately after video object plane start code 952 and continues for n bytes. The byte encryption quantity, n, is also stored within the portion of the frame decryption information 995 corresponding to the first frame 954. As is indicated by FIG. 9, the encrypted portion 956 of first encrypted frame 954 extends across its entire video object plane (VOP) and partially into its original macroblock data field 918. As a result of this encryption of first frame 904 into encrypted first frame 954, a blank frame would be "displayed" at the position of the encrypted first frame 954 upon playback of encrypted video stream 950.

Again referring to FIG. 9, the second encrypted frame 960 of encrypted video stream 950 contains video object plane start code 962 as its first element. In order to properly decrypt the encrypted video stream 950, video object plane start code 962 is not encrypted. As is illustrated by FIG. 9, second encrypted frame 960 is encrypted in accordance with a middle offset encryption function. This results in a middle offset 965 being interposed between video object plane start code 962 and the beginning of the encrypted portion 968 of frame 960. In this case the encrypted portion 968 does not encompass any part of video object plane 964 (which is thus identical to video object plane 924 of original video stream 900). As a consequence of use of middle offset 965, the encrypted portion 968 is seen to lie within the field which had previously been macroblock 926 of original video stream 900, thereby dividing it into macroblock fragment 966 and macroblock fragment 970.

As may be appreciated by inspection of FIG. 9, the third frame 975 in encrypted video stream 950 is unencrypted. It follows that each component (e.g., video object plane start code 978, video object plane 980 and macroblock 982) of third frame 975 is identical to its counterpart within the third frame 930 of original digital video stream 900.

Figure 1:
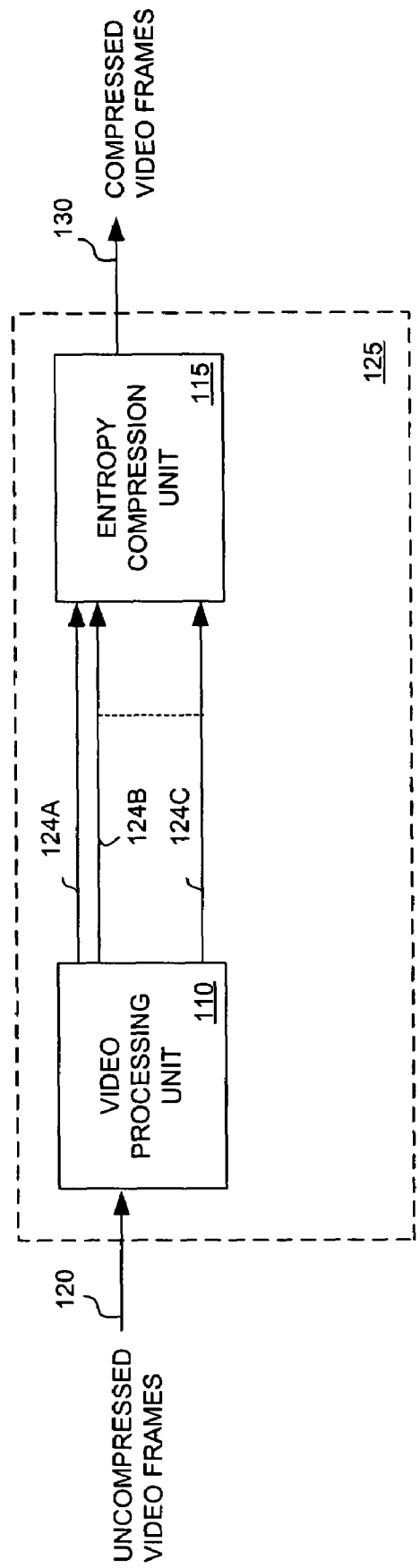
FIG. 1 is a block diagram of a conventional digital video encoder.
Figure 2:
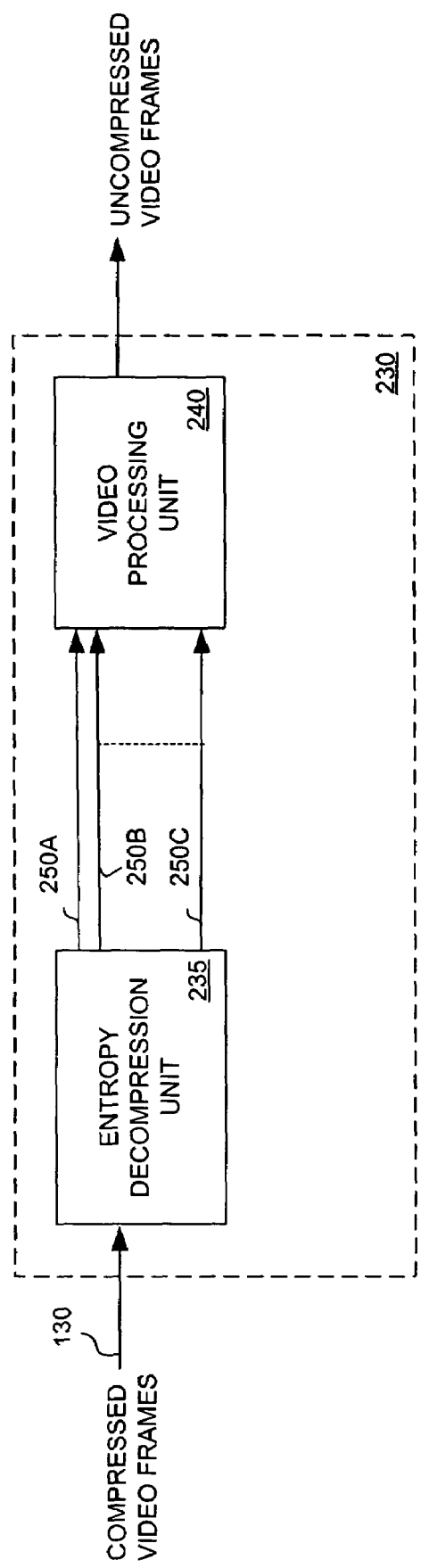
FIG. 2 is a block diagram of a conventional digital video decoder.
Figure 3:
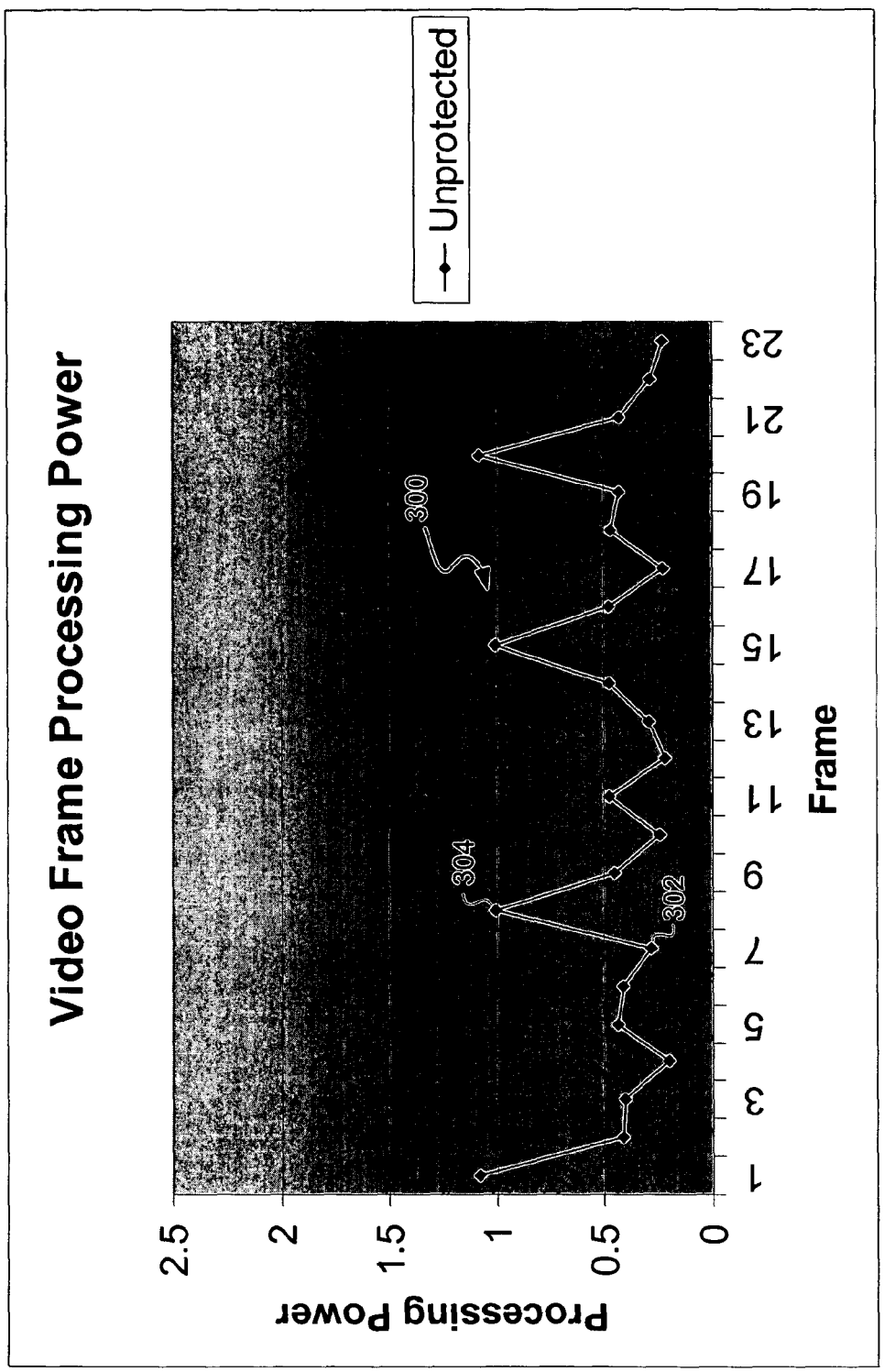
FIG. 3 shows a graph displaying an approximate representation of the relative processing power expected to be required in connection with conventional decoding of frames of different sizes.
Figure 4:
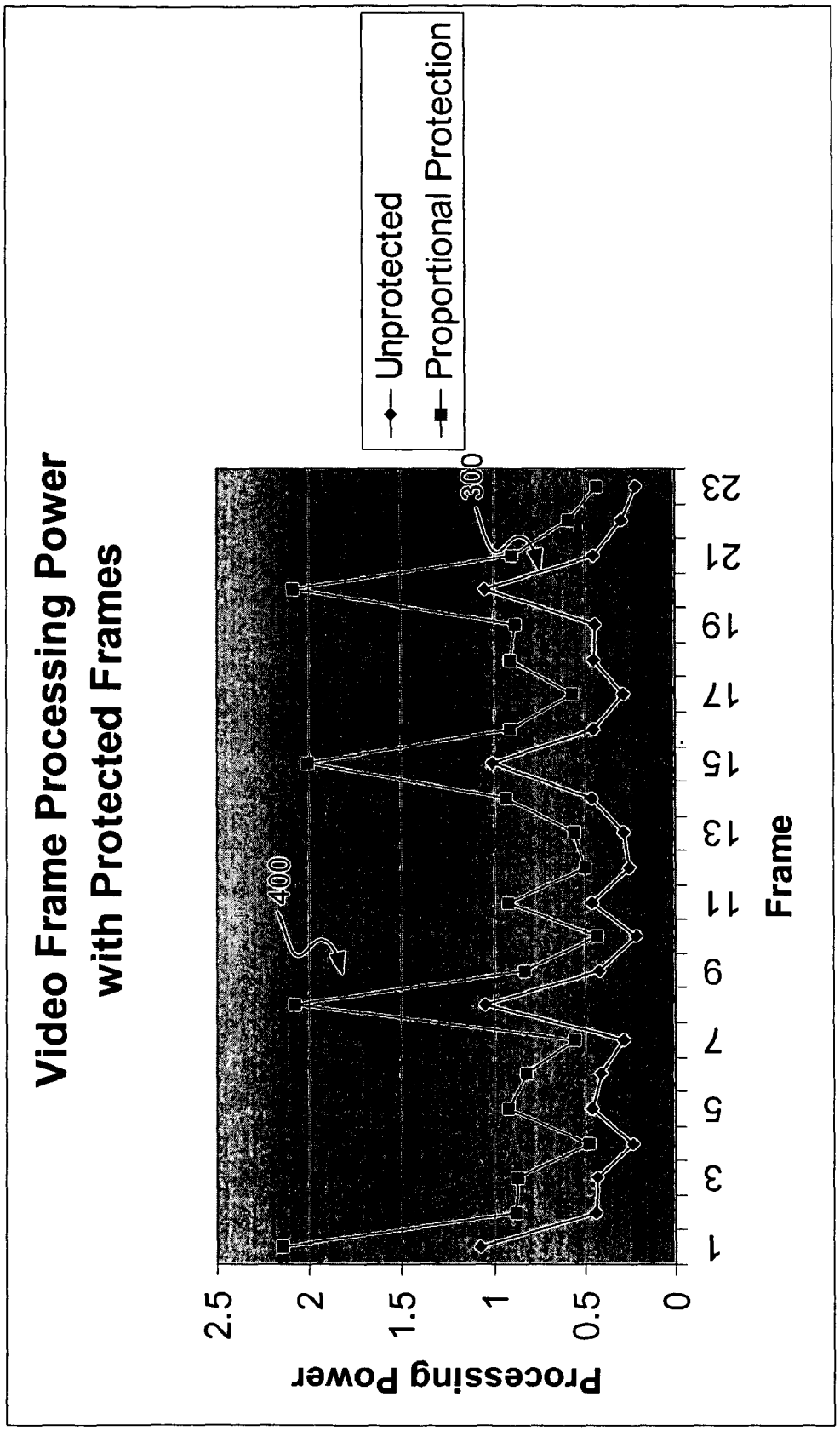
FIG. 4 provides a graphical representation of the additional processing power necessary to decrypt and decode fully-encrypted frames FIG. 5 provides an overview of header layout and middle layout encryption of the present invention as applied to various frames formatted consistently with the MPEG-4 standard.
Figure 10:
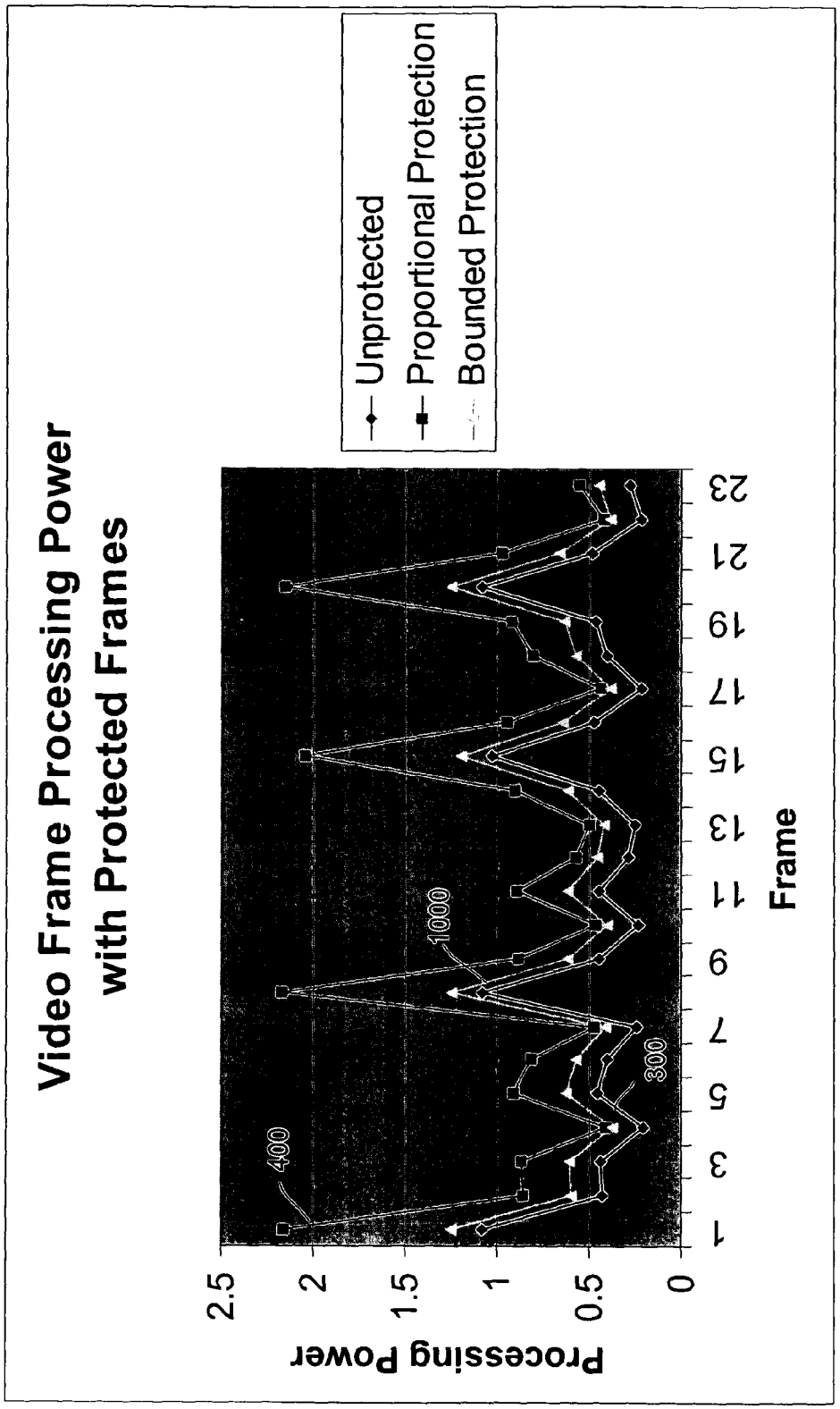
FIG. 10 provides a graphical comparison of the processing power required for decryption of a digital video stream encrypted in accordance with the present invention relative to the power required for decryption of a conventionally-encrypted video stream.

FIG. 10 provides a graphical comparison of the processing power required for decryption of a digital video stream encrypted in accordance with the present invention relative to the power required for decryption of a conventionally-encrypted video stream. Referring to FIG. 10, there is illustratively represented a graph 1000 indicative of the processing power required for decrypting a digital video stream encrypted in accordance with the present invention. Also shown are the graph 300 (FIG. 3) and the graph 400 (FIG. 4), which illustratively indicate the processing resources consumed in connection with decryption of conventionally-encrypted video streams. It is apparent from inspection of FIG. 10 that the bounded encryption approach of the invention requires substantially less peak processing power (see, e.g., frames 8, 15, and 20) during the decryption process than would otherwise be required using standard encryption techniques.

Figure 11:
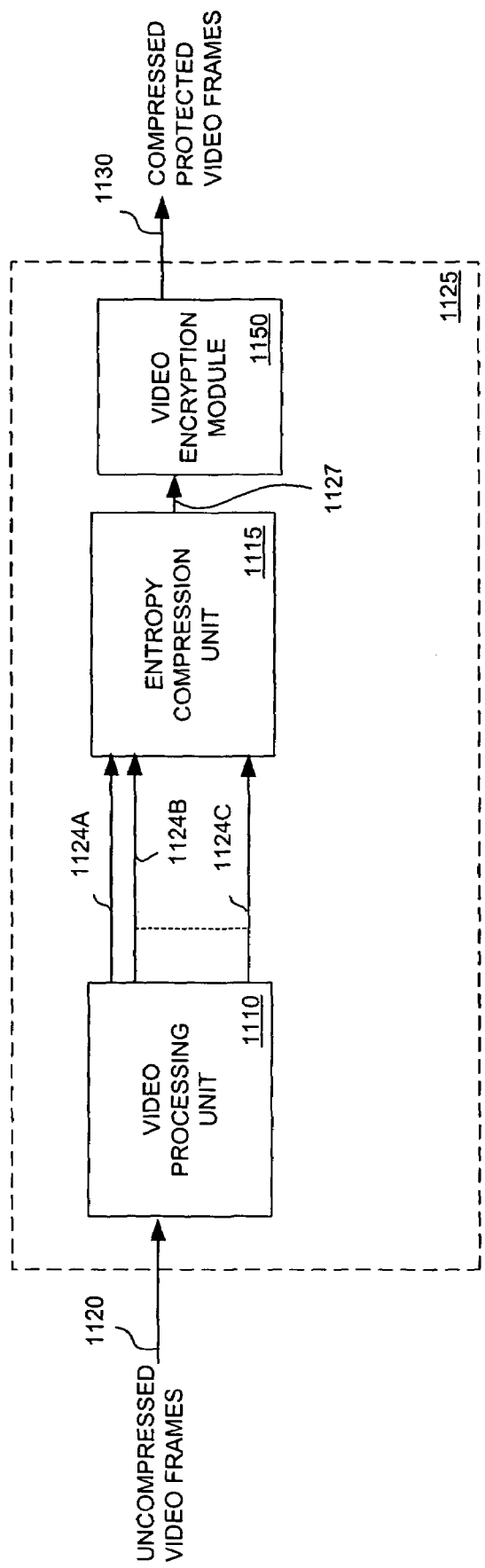
FIG. 11 shows an encrypting digital video encoder containing a video encryption module configured in accordance with the invention.

FIG. 11 shows an encrypting digital video encoder 1125 containing a video encryption module 1150 configured in accordance with the invention. As shown, the digital video encoder 1125 includes a video processing unit 1110 that accepts a sequence of uncompressed video frames 1120. The video processing unit 1110 applies conventional video signal processing techniques to the uncompressed frames 1120 in accordance with the applicable encoding standard, thereby producing a plurality of video information streams 1124. These signal processing techniques may include, for example, motion compensation, filtering, 2D-transformation, block mode decisions, motion estimation, and quantization. As a consequence, the video information streams may be comprised of, for example, data streams, motion vectors and quantized DCT coefficients. Using the video information streams 1124, an entropy compression unit 1115 functions to produce a sequence of compressed digital frames 1127 to the video encryption module 1150. In the exemplary embodiment the video processing unit 1110 and entropy compression unit 1115 operate in conformance with the encoding specifications of the MPEG-4 video standard. As shown in FIG. 8, the video encryption module 1150 generates a protected stream of compressed video frames 1130 by operating upon the compressed digital frames 1127 in a manner consistent with the invention described herein.

Figure 12:
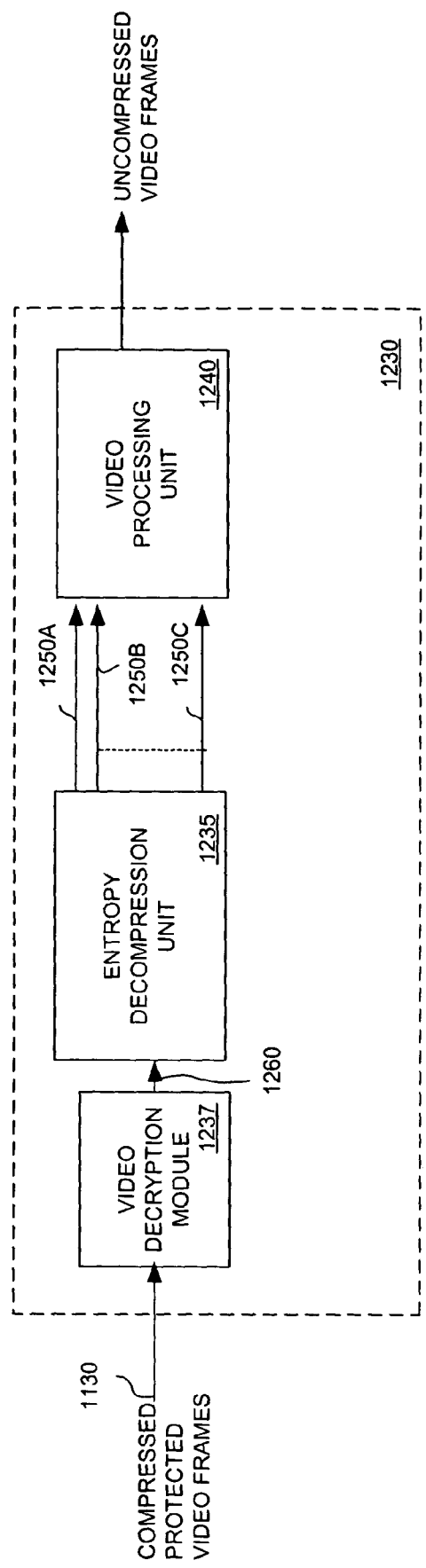
FIG. 12 shows a decrypting digital video decoder containing a video decryption module configured in accordance with the invention.

FIG. 12 shows a decrypting digital video decoder 1230 containing a video decryption module 1237 configured in accordance with the invention. As shown in FIG. 12, the decrypting digital video decoder 1230 also includes an entropy decompression unit 1235 and a video processing unit 1240. During operation of the video decoder 1230, the video decryption unit 1237 receives the protected stream of compressed video frames 1130 and decrypts each encrypted frame in the manner described above with reference to FIG. 8. The resultant unencrypted, compressed video stream 1260 is provided to an entropy decompression unit 1235 operative to perform the inverse of the operations effected by the entropy compression unit 1115 (e.g., inverse quantization, inverse 2-D transformation). As shown, the result of the operations conducted by the decompression unit 1235 are a plurality of video information streams 1250 which may comprise, for example, data streams, motion vectors, and quantized DCT coefficients. The video processing unit 1240 then reconstructs replicas of the uncompressed video frames 1120 using the plurality of video information streams 1250. In the exemplary embodiment the video processing unit 1240 and entropy decompression unit 1235 operate in conformance with the decoding specifications of the MPEG-4 video standard.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. A method for producing a protected stream of compressed video content, said method comprising:
   receiving an input stream of compressed video content containing a sequence of frames;
   generating a frame encryption key and storing the encryption key in a key table;
   creating a set of encrypted frames by encrypting at least selected portions of selected frames of said sequence of frames using the frame encryption keys in accordance with a frame encryption function;
   generating frame decryption information necessary to decrypt said set of encrypted frames including an encryption key pointer identifying a decryption key to be used in the decryption of each encrypted frame; and
   assembling at least said set of encrypted frames, unencrypted frames of said sequence of frames, and said frame decryption information to produce the protected stream of compressed video content;
   wherein said frame decryption information is synchronized with said set of encrypted frames into a synchronized frame decryption stream.

2. The method of claim 1, wherein said synchronized frame decryption stream includes references to frame encryption keys in the key table.

3. The method of claim 1, wherein said synchronized frame decryption stream includes encryption status information corresponding to each frame of said protected stream.

4. The method of claim 1, wherein said synchronized frame decryption stream includes a reference to a decryption key in the key table.

5. The method of claim 1, wherein said synchronized frame decryption stream includes intra-frame encryption offset information corresponding to each encrypted frame of said protected stream.

6. The method of claim 5 further including parsing said input stream in order to determine frame boundaries and frame types associated with frames of said sequence of frames.

7. The method of claim 6 further including maintaining counts corresponding to each of said frame types, said counts and said boundaries being used to determine said intra-frame encryption offset information.

8. The method of claim 7 wherein said parsing further includes determining sizes of said frames of said sequence of frames, said sizes also being used in determining said intra-frame offset information.

9. The method of claim 6 further including maintaining counts corresponding to each of said frame types, said counts being used to determine when to use a new frame encryption key in said encrypting of said selected frames.

10. The method of claim 1, wherein said synchronized frame decryption stream includes information identifying a data field size to be decrypted with respect to each encrypted frame of said protected stream.

11. The method of claim 1 further including encrypting a first consecutive number of said selected frames using a first frame encryption key and encrypting a second consecutive number of said selected frames using a second frame encryption key.

12. The method of claim 1 further including determining a number of bytes to be encrypted within each of said selected frames based upon a level of available processing power and a desired degradation of visual quality.

13. The method of claim 1, further comprising:
   receiving an input stream of video content containing a sequence of frames; and
   generating the input stream of compressed video content by applying processing techniques in accordance with an applicable encoding standard to produce a plurality of video information streams;
   wherein the encrypting of selected frames includes encrypting a portion of a predetermined video information stream.

14. A method for decrypting a protected stream of compressed video content comprising:
   receiving an input stream of compressed video content containing encrypted frames and unencrypted frames;
   receiving frame decryption information necessary to decrypt said encrypted frames, said frame decryption information is synchronized with said set of encrypted frames into a synchronized frame decryption stream and distinguishes said encrypted frames from said unencrypted frames;
   obtaining an applicable frame decryption key from the received frame decryption information; and
   decrypting selected portions of said encrypted frames using a frame decryption function in accordance with said frame decryption information, which identifies the specific portions of the frames to be decrypted and the applicable frame decryption key from the frame decryption information.

15. The method of claim 14 wherein said input stream and said synchronized frame decryption stream collectively comprise a protected video stream, said synchronized frame decryption stream being synchronized with said encrypted frames within said input stream.

16. The method of claim 14 wherein said synchronized frame decryption stream includes encryption status information corresponding to each of said encrypted frames.

17. The method of claim 14 wherein said synchronized frame decryption stream includes a reference to a frame decryption key for each of said encrypted frames.

18. The method of claim 14 wherein said synchronized frame decryption stream includes intra-frame encryption offset information corresponding to each of said encrypted frames.

19. The method of claim 14 wherein said synchronized frame decryption stream includes size information identifying a data field size to be decrypted with respect to each of said encrypted frames.

20. The method of claim 14 wherein said decrypting includes decrypting a first consecutive number of said encrypted frames using a first frame decryption key and decrypting a second consecutive number of said encrypted frames using a second frame decryption key.

21. An encrypting digital video encoder comprising:
a video processing unit for generating a plurality of input data streams in response to a sequence of uncompressed video frames;
an entropy compression unit for creating, based upon said plurality of input data streams, compressed video content containing a sequence of compressed frames; and
a video encryption module configured to generate a table of encryption keys;
wherein the video encryption module is also configured to create a set of encrypted frames by encrypting at least selected portions of selected frames of said sequence of compressed frames using said frame encryption keys in accordance with a frame encryption function;
wherein the video encryption module is also configured to transform said sequence of compressed frames into a protected video stream containing at least the set of encrypted frames, the unencrypted frames and a synchronized frame decryption stream necessary to decrypt said set of encrypted frames;
wherein said synchronized frame decryption stream includes encryption key pointers identifying encryption a decryption key to be used in the decryption of each encrypted frame.

22. The encoder of claim 21 wherein said protected video stream is comprised of an encrypted video stream including said set of encrypted frames and unencrypted ones of said compressed frames, said synchronized frame decryption stream being synchronized with said encrypted video stream.

23. The encoder of claim 22 wherein said synchronized frame decryption stream includes encryption status information corresponding to each frame of said encrypted video stream.

24. The encoder of claim 22 wherein said synchronized frame decryption stream also includes, intra-frame encryption offset information, and data field size decryption information corresponding to each frame of said encrypted video stream.

25. The encoder of claim 21 wherein said video encryption module is operative to parse said sequence of frames in order to determine frame boundaries and frame types associated with individual frames of said sequence of frames.

26. The encoder of claim 25 wherein said video encryption module is operative to maintain counts corresponding to each of said frame types, said counts and said boundaries being used to determine intra-frame encryption offset information.

27. The encoder of claim 25 wherein said video encryption module is operative to maintain counts corresponding to each of said frame types, said counts being used to determine when to create new encryption keys used in generating ones of said encrypted frames.

28. The encrypting digital video encoder of claim 21, wherein the entropy compression unit is configured to encrypt a predetermined one of said video information streams.

29. A decrypting digital video decoder comprising:
a video decryption module configured to receive a protected input stream of compressed video content containing at least a set of encrypted frames and synchronized frame decryption stream, said synchronized frame decryption stream being necessary for decrypting said set of encrypted frames so as to form a set of decrypted frames;
wherein the video decryption module is further configured to obtain an applicable frame decryption key from the received frame decryption stream;
wherein the video decryption module is further configured to generate the set of decrypted frames by decrypting selected portions of the encrypted frames in accordance with said frame decryption stream, which identifies the specific portions of the frames to be decrypted and the applicable frame decryption key;
an entropy decompression unit for creating, based at least in part upon said set of decrypted frames, a plurality of video data streams; and
a video processing unit for generating an output stream of uncompressed video content in response to said plurality of video data streams;
wherein said synchronized frame decryption stream includes encryption key pointers identifying an applicable decryption key to be used in the decryption of each encrypted frame.

30. The decoder of claim 29 wherein said protected input stream is comprised of an encrypted video stream including said set of encrypted frames and unencrypted frames, said synchronized frame decryption stream being synchronized with said encrypted video stream.

31. The decoder of claim 30 wherein said synchronized frame decryption stream includes encryption status information corresponding to each frame of said encrypted video stream.

32. The decoder of claim 30 wherein said synchronized frame decryption stream also includes intra-frame encryption offset information, and data field size decryption information corresponding to each frame of said encrypted video stream.

* * * * *